(12) United States Patent
Schlipf et al.

(10) Patent No.: US 9,085,695 B2
(45) Date of Patent: *Jul. 21, 2015

(54) POLYMER COMPOUND AS WELL AS STRUCTURAL PARTS PRODUCED USING THE COMPOUND

(75) Inventors: Michael Schlipf, Heidenheim (DE); Claudia Stern, Tannhausen (DE); Martin Maier, Ingersheim (DE)

(73) Assignee: ElringKlinger AG, Dettingen (DE)

( * ) Notice: Subject to any disclaimer, the term of this patent is extended or adjusted under 35 U.S.C. 154(b) by 514 days.

This patent is subject to a terminal disclaimer.

(21) Appl. No.: 12/799,089

(22) Filed: Apr. 16, 2010

(65) Prior Publication Data

US 2010/0300726 A1 Dec. 2, 2010

(30) Foreign Application Priority Data

Apr. 17, 2009 (DE) .......................... 10 2009 018 636

(51) Int. Cl.
| | | |
|---|---|---|
| *C08L 79/08* | (2006.01) | |
| *C08L 27/18* | (2006.01) | |
| *C08L 81/04* | (2006.01) | |
| *B29C 47/00* | (2006.01) | |
| *C08L 81/02* | (2006.01) | |
| *C08L 81/06* | (2006.01) | |
| *B29K 79/00* | (2006.01) | |
| *B29K 27/18* | (2006.01) | |
| *C08L 27/12* | (2006.01) | |
| *H01B 3/44* | (2006.01) | |
| *H01B 3/30* | (2006.01) | |

(52) U.S. Cl.
CPC ............. *C08L 81/04* (2013.01); *B29C 47/0004* (2013.01); *C08L 27/18* (2013.01); *C08L 79/08* (2013.01); *C08L 81/02* (2013.01); *C08L 81/06* (2013.01); *B29C 47/0016* (2013.01); *B29C 47/0023* (2013.01); *B29K 2027/18* (2013.01); *B29K 2079/085* (2013.01); *C08L 27/12* (2013.01); *H01B 3/301* (2013.01); *H01B 3/445* (2013.01); *Y10T 428/139* (2015.01)

(58) Field of Classification Search
CPC ... C08L 27/18; H01B 3/301; B29K 2079/085
USPC ................... 524/404, 544; 525/540
See application file for complete search history.

(56) References Cited

U.S. PATENT DOCUMENTS

| | | | |
|---|---|---|---|
| 3,652,409 A | 3/1972 | Mack et al. ...................... 252/12 |
| 4,026,863 A * | 5/1977 | Iseki et al. ..................... 523/205 |
| 4,433,104 A * | 2/1984 | Giles, Jr. ........................ 525/180 |
| 5,093,403 A * | 3/1992 | Rau et al. ...................... 524/404 |
| 5,408,000 A * | 4/1995 | Katsaros et al. ............... 525/179 |
| 5,684,088 A * | 11/1997 | Miyamori et al. ............... 525/64 |
| 5,686,176 A * | 11/1997 | Adam et al. .................. 428/327 |
| 6,509,422 B1 * | 1/2003 | Nagashima et al. .......... 525/422 |
| 6,531,559 B1 * | 3/2003 | Smith et al. ................... 526/255 |
| 6,774,196 B1 * | 8/2004 | Taira et al. .................... 526/247 |
| 6,818,706 B2 * | 11/2004 | Marx ......................... 525/328.5 |
| 7,241,826 B2 * | 7/2007 | Shiotsuki et al. ............. 524/404 |
| 2006/0121288 A1 * | 6/2006 | Mochizuki et al. ........... 428/421 |
| 2007/0015875 A1 * | 1/2007 | Globus et al. ................. 525/199 |
| 2007/0066737 A1 * | 3/2007 | Gallucci et al. ............... 524/430 |

FOREIGN PATENT DOCUMENTS

| | | |
|---|---|---|
| DE | 19619232 A1 * | 11/1997 |
| DE | 101 08 347 A1 | 8/2002 |
| DE | 10 2007 040 095 A1 | 2/2009 |
| EP | 423995 A1 * | 4/1991 |
| WO | WO 90/04618 | 5/1990 |
| WO | WO 97/43102 | 11/1997 |
| WO | WO 01/38749 A1 | 5/2001 |
| WO | WO 01/60911 | 8/2001 |
| WO | WO 03/078481 | 9/2003 |
| WO | WO 2008/003466 A1 | 1/2008 |

OTHER PUBLICATIONS

Machine translation of DE 19619232 A1, May 2012.*
S. Ebnesajjad, Fluoroplastics, vol. 1, Non-Melt Processible Fluoroplastics, Verlag William Andrew Publishing, 2000.

* cited by examiner

*Primary Examiner* — Nicole M Buie-Hatcher

(57) ABSTRACT

In order to make available polymer compounds that are improved with respect to their properties compared to conventional PTFE, on the one hand, and the further high-performance polymer or polymers, on the other, it is proposed that a polymer compound has a proportion of a fully fluorinated thermoplastic polymer material as well as a proportion of at least one further high-performance polymer different therefrom, selected from the group of polyphenylene sulphide (PPS), polyphenylene sulphone ($PPSO_2$), polyamide (PA), polyimide (PI), polyamide-imide (PAD), and polyether imide (PEI) as well as copolymers and derivatives of these polymers and copolymers, wherein the compound has a homogeneous distribution of the proportions of the polymers and the polymer material.

18 Claims, 2 Drawing Sheets

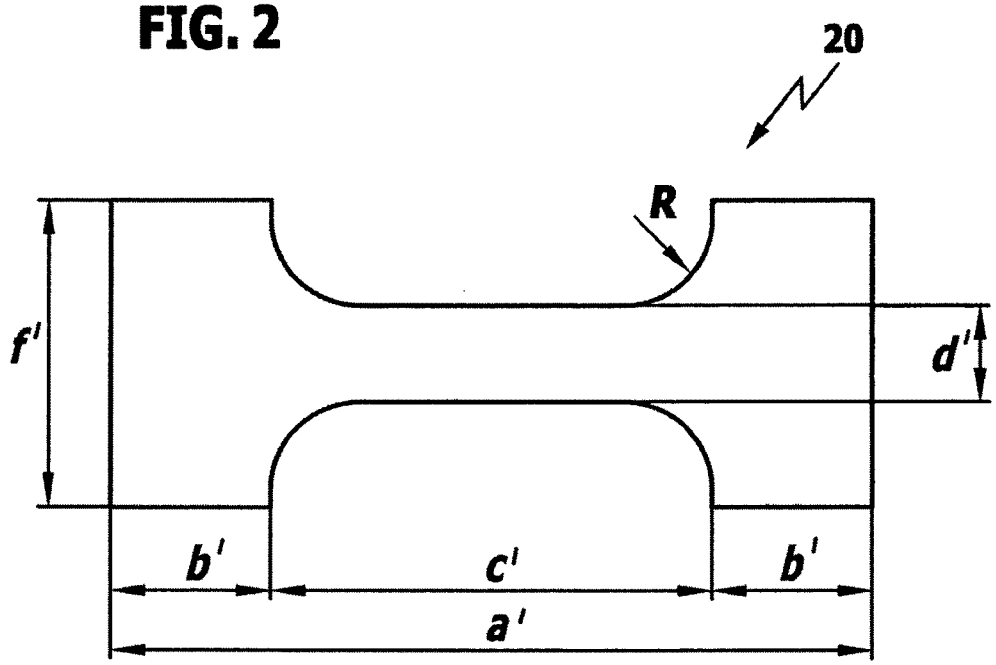

POLYMER COMPOUND AS WELL AS STRUCTURAL PARTS PRODUCED USING THE COMPOUND

Figure 1:
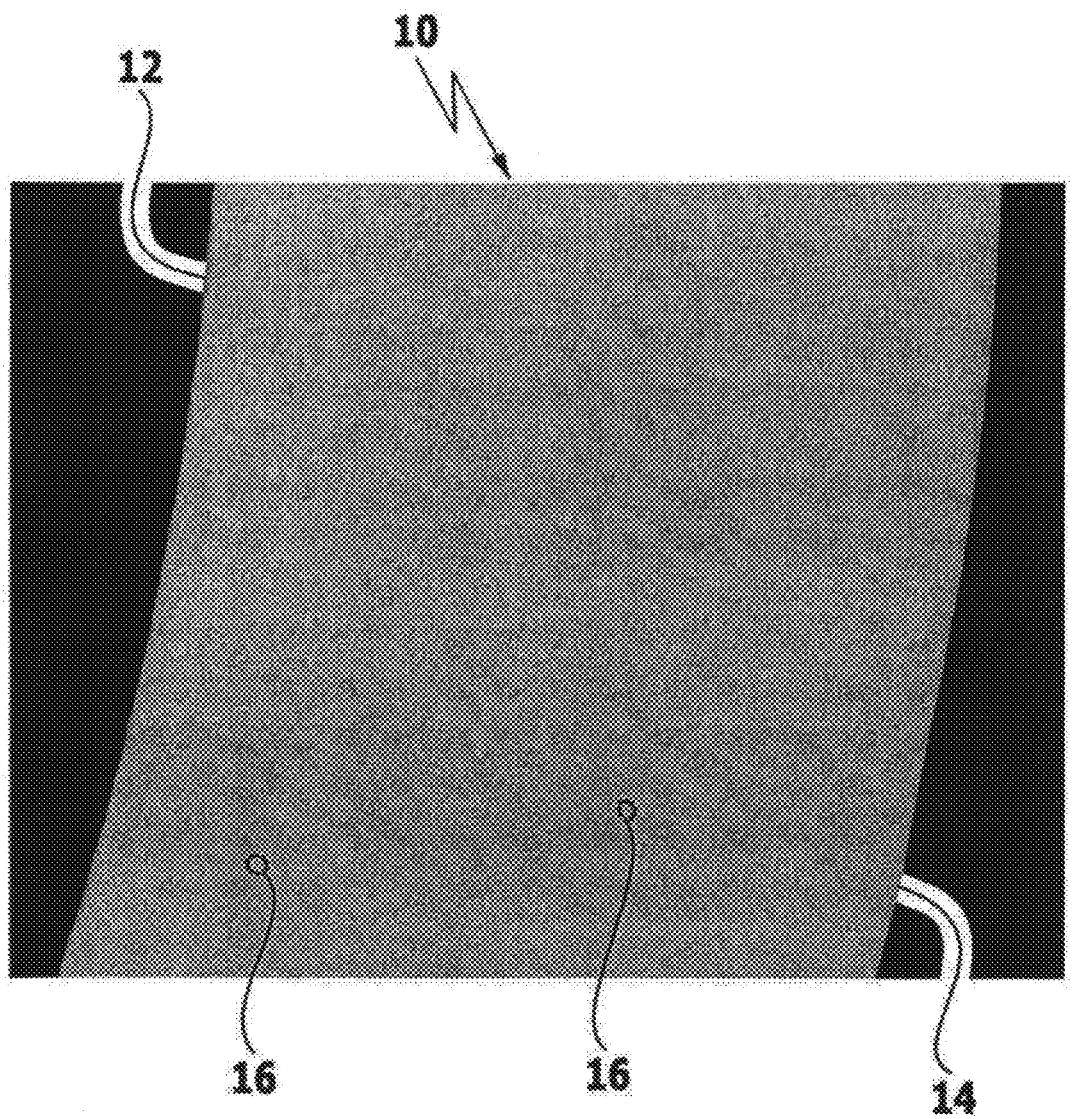

The invention relates to a new type of polymer compound comprising a fully fluorinated thermoplastic polymer material, in particular melt-processable PTFE (m-PTFE), as well as a proportion of at least one further high-performance polymer different therefrom selected from the group of polyphenylene sulphide (PPS), polyphenylene sulphone ($PPSO_2$), polyamide (PA), polyimide (PI), polyamide-imide (PAI), and polyether imide (PEI) as well as copolymers and derivatives of these polymers and copolymers, wherein the compound has a homogeneous distribution of the proportions of the polymers and the polymer material.

The use of conventional or standard PTFE in compounds with various high-performance polymers of those mentioned above is known per se. Such compounds are produced by mixing the different polymers in powder form and by subsequent press sintering or extrusion, depending on the type of main component. If PTFE constitutes the main component, the proportion of the further high-performance polymer is generally limited to approximately 30% by weight at maximum. In the case where the main component is formed by the further high-performance polymer, the proportion of PTFE is typically limited to 20% by weight at maximum.

In the first case, with proportions of the further high-performance polymer above 20% by weight, the mechanical properties such as stress at failure and/or elongation at failure, for example, become noticeably poorer, since the high proportion of the further high-performance polymer, which acts as a kind of filler in the PTFE matrix, significantly interferes with the cohesion of the PTFE matrix.

In the second case, the consequence of larger PTFE contents is primarily that the compound with the further high-performance polymer as main component is no longer workable using the classic methods of thermoplastic processing.

Slightly higher proportions of PTFE up to approximately 30% by weight are possible if the so-called hot-compression moulding process is applied. With still higher proportions of PTFE, the matrix formed by the further high-performance polymer is significantly interfered with and the mechanical material properties are drastically reduced.

An unsatisfactory aspect with these compounds is that these cannot be obtained with a homogeneous melt structure. Therefore, the strived for improvements in the properties of the respective main components by compounding with the other polymer proportion can be achieved at best on a small scale.

For these reasons compounds with intermediate mixture ratios are not available.

Typically, in the case of compounds with the further high-performance polymer, e.g. PI or PPS, as main component, in the described processes the PTFE particles are still retained as individually recognisable grains even after processing the thermoplastic. The particles of the PTFE components are fully retained as such with the processing temperatures usual for the further high-performance polymers of typically 320° C.±10° C.

In the case of compounds with PTFE as the main component, the particles of the further high-performance polymer are also retained as individual particles after running through the processing methods usual for PTFE, although while both components melt below the sintering temperatures usual for PTFE of approximately 360° to 380° C., because of the high melt viscosity of the conventional or standard PTFE (typically approximately $10^{10}$ to $10^{13}$ Pa.s at 380° C.), on the one hand, and due to the fact that no shearing forces act on the polymer melt in these typical processing methods for PTFE, on the other, no or only slight mutual mixing effects occur.

When reference is made to properties of conventional or standard PTFE as above or in the following parts of the description, this focuses on properties such as those observed for Dyneon TF 1750 types of standard PTFE.

It is an object of the invention to make polymer compounds available that are improved with respect to their properties compared to conventional PTFE (polytetrafluoroethylene), on the one hand, and the further high-performance polymer or polymers, on the other.

This object is achieved by a polymer compound in accordance with the invention.

Because of the selection of the PTFE component as fully halogenated, in particular fully fluorinated, thermoplastic plastic material, the compound can be obtained with a high homogeneity in structural configuration.

This is particularly apparent in that in the case of the compounds according to the invention the individual components are no longer identifiable as the original mixture of two substances in powder form in the solidified end product after processing using the usual methods for thermoplastics, i.e. by means of extrusion or injection moulding processes, for example.

In contrast to the compounds according to the invention, phases of the individual components can be detected in conventional compounds by means of special methods, e.g. staining techniques in association with a light-optical microscope, or by using polarised light. Depending on the type of PTFE used, larger or smaller PTFE island structures are retained in the compound, with typical extents of approximately 0.2 μm or more in the case of emulsion-polymerised PTFE, with typical extents of approximately 15 μm or more in the case of suspension-polymerised PTFE.

In comparison, the compound according to the invention is substantially free from PTFE island structures.

In the case of the compounds according to the invention there is no restriction of the mixture ratios as explained above and the composition of the compound can be widely varied with respect to the proportions of fully fluorinated thermoplastic plastic material, in particular melt-processable PTFE, and also the further high-performance polymer component(s).

Surprisingly, the compounds according to the invention exhibit considerably improved mechanical properties compared to the conventional PTFE compounds and thus open up a plurality of possibilities of use.

In particular, compounds according to the invention containing a high proportion of further high-performance polymer and a lower proportion of thermoplastically workable PTFE can be produced with a high percent elongation at failure.

These properties are required in particular when the typical property spectrum of the pure component of the high-performance polymer, i.e. a high E-modulus, a high deformation resistance and a high breaking strength, is required, while on the contrary the high brittleness of the high-performance polymer prevents successful use.

Applications with this requirement profile are, for example, large-dimension seals in oil feed installations, including containers, hoses or pipes of oil production derricks or oil tankers or generally in chemical plant construction, in which seals made of the materials according to the invention have to compensate production tolerances of steel structures for a secure seal, which requires a high adaptability. These plants are also subject to high fluctuations in temperature, force application and pressure during use with the resulting changes in dimensions, which requires a good following capacity of the material of the seal.

PTFE materials, in particular also standard PTFE, naturally have higher elongation at failure values than the further high-performance polymers. However, a drastic drop in the elongation at failure values is also observed here as proportions thereof increase in the compound.

In comparison, with the same ratios of the proportions of fully fluorinated plastic material to further high-performance polymer, in particular also PAI, PEI or PPS, the compounds according to the invention have clearly more favourable elongation at failure values, which are of great importance in many applications.

Moreover, the compounds according to the invention are suitable for the production of high-temperature-resistant structural parts, which exhibit a favourable behaviour in fire. Such structural parts are of great interest in aircraft construction, e.g. in the form of flexible electric cables.

When using the compounds according to the invention for the production of cable insulation systems, their better electrical properties as well as the higher dielectric strength are significant.

Moreover, the compounds according to the invention are eminently suitable for the production of injection moulded parts, wherein in particular the high mechanical strength of the structural parts obtained with respect to pressure and tensile loads are of advantage.

The higher mechanical strength values achievable with the compounds according to the invention, the higher pressure resistance and the associated higher bursting pressure as well as the higher stability under pressure in the case of long-term pressure loading both at room temperature and at temperatures up to 250° C. play a significant role in the production of flexible tubes.

Last but not least, foamed materials can be produced with the compounds according to the invention, in which a narrower pore size distribution, lower densities and associated better insulation properties, in particular also in the case of cable insulation systems, are possible. The mentioned cable insulation systems include, for example, the external insulation of a centrally positioned internal conductor or the insulating dielectric of a coaxial cable positioned concentrically between the internal conductor and the enveloping external conductor.

In addition, the compounds according to the invention allow the production of further materials with a high flexibility, e.g. films such as those required for the production of flexible circuit boards, for example. A typical representative of m-PTFE is Moldflon® MF10005. According to test method IPC-TM-650, 2.4.3 films made of Moldflon® MF10005 with a thickness of 50 μm typically show a bending strength under alternating loading of >1.2 million test cycles. Strength values can increase according to the invention with the further high-performance polymer without the fatigue strength being noticeably impaired. Besides the use for flexible circuit boards, the compounds according to the invention are also highly suitable for the production of Starrflex circuit boards.

Moreover, compounds according to the invention can be produced with improved sliding properties, wherein a stick-slip effect can be avoided while the coefficient of friction is very low, in particular in the case of the compounds according to the invention with a high proportion of melt-processable PTFE. With a sliding speed of V=0.6 m/s and a load perpendicular to the sliding direction of 0.5 to 1.5 N/mm$^2$ coefficients of friction in the range of 0.1 to 0.3 are possible here.

Therefore, one of the important areas of use of the compounds according to the invention is also that of the plain bearing, in particular that of the dry-running plain bearing.

One of the consequences of the low coefficient of friction is the low wear values of the compounds according to the invention. This, amongst other factors, is also important for the plain bearing application.

In addition, structural parts made from the compounds according to the invention are also suitable for higher specific surface pressures, exhibit lower abrasion and thus a longer service life. This is again an important property for plain bearing applications.

The aforementioned advantages of the compounds according to the invention with fully fluorinated thermoplastic polymer materials, in particular m-PTFE, apply in comparison to compounds, which with the same percentage composition contain standard PTFE or chemically modified high-molecular PTFE as fully fluorinated components.

The compounds according to the invention are preferably produced by means of melt-compounding.

TFE (tetrafluoroethylene) copolymers, in which the comonomer has a minimum proportion of 0.2 mole %, can be employed in particular as fully fluorinated thermoplastic plastic materials.

The comonomer is preferably selected from hexafluoropropylene, perfluoroalkyl vinyl ether, perfluoro-(2,2-dimethyl-1,3-dioxol) and chlorotrifluoroethylene.

Copolymers of TFE with chlorotrifluoroethylene are also included under fully fluorinated plastic materials in the context of the present invention, since the proportion of halogen other than fluorine is comparatively low.

A comonomer of the polyalkyl vinyl ether type frequently to be used within the framework of the invention is perfluoropropyl vinyl ether (PPVE). Proportions of less than 3.5 mole % are recommended in the case of this comonomer, since the PTFE properties are substantially retained here and thermoplastic processing is nevertheless possible. It is further preferred if the proportion of comonomer is limited to less than approximately 3 mole %, and proportions of comonomer of less than approximately 2.5 mole %, e.g. 1 mole % or less or 0.5 mole % or less, are still further preferred.

The use of thermoplastically workable PTFE, also melt-processable PTFE or m-PTFE for short, is particularly preferred. Many such materials are described in WO 01/60911 and WO 03/078481, for example.

PFA (perfluoroalkoxy copolymer, a copolymer of tetrafluoroethylene and perfluoro (alkyl vinyl ether)) also represents a suitable fully fluorinated thermoplastically workable plastic material in the sense of the present invention.

Besides the TFE copolymers, polymer blends of PTFE and one or more further thermoplastically workable fluorinated plastics are usable as fully halogenated, in particular fully fluorinated, plastic material that can be used according to the invention.

These further fully halogenated plastic materials are selected in particular from the group of PTFE micropowders. These are PTFE types with a low molecular weight and low melt viscosity compared to high-molecular (standard) PTFE. They are typically produced either by emulsion polymerisation, by thermomechanical degradation of high-molecular PTFE in the extruder or by radiation degradation of high-molecular PTFE, followed by a grinding process.

The differences in properties of conventional or high-molecular (standard) PTFE and low-molecular PTFE micropowders can be represented, for example, as follows (cf. S. Ebnesajjad, Fluoroplastics, vol. 1, Non-Melt Processable Fluoro-Plastics, William Andrew Publishing, 2000):

| Product | Molecular Weight | Melt Viscosity at 380° C. in Pa·s |
|---|---|---|
| Standard PTFE | approx. $10^6$-approx. $10^8$ | approx. $10^{10}$-approx. $10^{13}$ |
| Micropowder | approx. $10^4$-approx. $10^6$ | approx. $10^2$-approx. $10^5$ |

Examples for such polymer blends can also be found in published documents WO 01/60911 and WO 03/078481.

The proportion of the further high-performance polymers in the total mass of the compounds according to the invention preferably amounts to 3% by weight or more. The improvement in properties is not particularly pronounced in some instances below such a proportion.

On the other hand, the proportion of the fully fluorinated thermoplastically workable polymer in the total mass of the compounds according to the invention should preferably amount to 1% by weight or more. This ensures that the improvements in properties as a result of the fully fluorinated plastic material are noticeable.

Preferred ratios of the proportions of fully fluorinated thermoplastic plastic material to the proportions of the further high-performance polymer or polymers lie in the range of approximately 20:80 to approximately 70:30.

It is worth emphasising the property of the compounds according to the invention of being easily workable on CNC cutting machines. This opens up many interesting fields of application to the compounds according to the invention that were previously closed to compounds based on conventional PTFE.

Preferred compounds according to the invention can contain additives, in particular in quantities of up to 60% by weight in relation to the total mass of the compound. Particularly preferred compounds according to the invention contain up to 40% by weight in additives.

Typical lower limits for additives lie at approximately 0.5% by weight.

If the compound contains colouring agents as additives, the lower limit for this type of additive typically lies at approximately 0.01% by weight. The upper limit for proportions of colouring agent in the compound typically lies at approximately 3% by weight.

Moreover, both organic and inorganic fillers can be employed as additives.

The fillers can be present in particular in fibre, granular or needle form.

Functional fillers such as e.g. solid lubricants such as BN, SiC, $MoS_2$, PTFE, graphite and the like, for example, are particularly preferred. Here the advantage of the compound according to the invention that the improved mechanical properties of the compound do not noticeably deteriorate as a result of filler contents if the proportions remain within the limits outlined above, is significant in particular also in the case of (standard) PTFE as filler.

Thus, in particular in the case of fire with (conventional) PTFE as filler it is possible to obtain non-drip plastic materials that are superior to the conventional materials with respect to mechanical properties.

These materials are particularly suitable as construction materials for use in public buildings and installations.

Further suitable reinforcing fillers are e.g. glass fibres and carbon fibres.

Carbon black is suitable in particular as filler to provide a desired electrical conductivity.

Further examples of suitable fillers are carbon particles, glass spheres and hollow glass spheres.

These and further advantages of the invention will be explained in more detail below on the basis of examples and figures.

FIG. 1 shows a light-optical microscope image of a structural part produced from a compound according to the invention; and FIG. 2 is a plan view onto a test piece according to SPI standard FD-105.

EXAMPLES

Examples 1 to 3

Compounds according to the invention made of PPS and m-PTFE of the type Moldflon® MF 10005 were produced in a thermoplastic mixing process in an anticorrosively fitted twin screw extruder. The processing conditions used therein are summarised in Table 1.

The PPS material used is commercially available as Ticona® PPS 0205.

Moldflon® MF 10005 is an m-PTFE polymer modified with a comonomer content of 1.7% by weight of PPVE. The melt flow rate MFR (372/5) amounts to 5 g/10 min.

TABLE 1

| Parameter | Unit | Value |
|---|---|---|
| Extruder | | |
| Screw diameter | mm | 25 |
| L/D | — | 42 |
| Temperatures | | |
| C1 | ° C. | 345 |
| C2 | ° C. | 355 |
| C3 | ° C. | 365 |
| C4 | ° C. | 365 |
| C5 | ° C. | 370 |
| Nozzle | ° C. | 375 |
| Screw rotational speed | revs/min | 90 |
| Mass pressure | bar | 1-2 |
| Mass temperature | ° C. | 394 |

As a result of the excellent melt-processability of the compounds according to the invention, the samples according to the invention are free of pores, in contrast to those produced from conventional compounds (cf. image in FIG. 1).

The improved homogeneity in the distribution of the two polymer materials of the compounds of the samples according to the invention can be seen from the image in FIG. 1.

FIG. 1 shows a section from a light-optical microscope image of a cylinder wall 10 of a tube produced from a compound according to Example 3, which shows a fully homogeneous distribution of the two polymer components PPS and m-PTFE over the entire wall thickness from the inside surface 12 to the outside surface 14. The radial distance from the inside surface 12 to the outside surface 14 amounts to 900 µm.

In the case of compounds, in which standard PTFE is used in place of the m-PTFE component, the PTFE contents are present as island structures, which have been drawn in schematically in FIG. 1 for comparison and provided with the reference 16.

Test plates in disc form with a diameter of 60 mm and a thickness of 1.5 mm were produced in the classic melt pressing process at a temperature of 340° C. from compounds with mixture ratios of 20% by weight of PPS and 80% by weight of Moldflon® MF 10005 (Example 1) and also 50% by weight of PPS and 50% by weight of Moldflon® MF 10005 (Example 2) and 80% by weight of PPS and 20% by weight of Moldflon® MF 10005 (Example 3).

FD-105 test pieces 20 in accordance with DIN EN ISO 12086 (cf. FIG. 2) were stamped out of the test plates and the mechanical characteristics E-modulus, stress at failure and elongation at failure were tested in accordance with DIN EN ISO 527-2. The measured values obtained are given in Table 2. The standard deviations are determined from 3 measured values.

The dimensions of the test piece 20 of FIG. 2 were as follows:
a'=38 mm
b'=8 mm
c'=22 mm
e'=5 mm
f=15 mm
radius R=5 mm thickness of the test piece=1.5 mm

TABLE 2

| Example | Weight Ratio in the Compound PPS:m-PTFE | E-Modulus [N/mm$^2$] | Stress at Failure [N/mm$^2$] | Elongation at Failure [%] |
|---|---|---|---|---|
| 1 | 20:80 | 850 ± 50 | 13 ± 1 | 200 ± 30 |
| 2 | 50:50 | 900 ± 50 | 14 ± 1 | 90 ± 10 |
| 3 | 80:20 | 2500 ± 50 | 60 ± 1 | 20 ± 4 |

Comparative Examples 1 to 3

Whereas in Examples 1 to 3 the test pieces were stamped out of test plates that had been produced in the melt pressing process, the test pieces in the comparative examples 1 and 2 were produced by stamping out of a sliced film with a thickness of 1.5 mm that was produced by peeling from a cylindrical body with an inside diameter of 40 mm and outside diameter of 75 mm. A test piece 20 according to FIG. 2 was also used here (FD-105 in accordance with DIN EN ISO 12086).

The cylindrical body was produced by pressing the polymer particle mixture at 300 bar and sintering in a forced air oven at 362° C. for 3 days.

The standard PTFE type used was Dyneon TF 1750, the PPS was of the type 0205 P4 from Ticona. The compounds were produced in a VAS 600 glass vacuum allround rapid mixer with a mixing time of 6 min.

Values of a commercially available PPS-PTFE compound with a mixture ratio of 85% by weight of PPS and 15% by weight of standard PTFE, which have been taken from the data sheet for the compound TECACOMP® PPS TF15 (Ensinger Compounds), are quoted in Table 3 as comparative example 3. The measured values come from type 1A test pieces in accordance with DIN ISO 527.

TABLE 3

| Comparative Example | Weight Ratio in the Compound PPS:Standard PTFE | E-Modulus [N/mm$^2$] | Stress at Failure [N/mm$^2$] | Elongation at Failure [%] |
|---|---|---|---|---|
| 1 | 10:90 | — | 21 | 300 |
| 2 | 15:85 | — | 18 | 280 |
| 3 | 85:15 | 3000 | 65 | 5 |

Table 3 demonstrates values for the E-modulus, stress at failure and elongation at failure in accordance with DIN EN ISO 527-2 for the materials of comparative examples 1 to 3.

The invention claimed is:
1. Polymer compound comprising a proportion of a fully fluorinated thermoplastic polymer material as well as a proportion of at least one further high-performance polymer different therefrom selected from the group of polyether imide (PEI) as well as copolymers and derivatives of this polymer and these copolymers, wherein the weight ratio of the proportions of the fully fluorinated thermoplastic polymer material to the proportions of the at least one further high-performance polymer amounts to about 20:80 to about 70:30, wherein said fully fluorinated thermoplastically workable polymer material comprises melt-processable polytetrafluoroethylene in the form of a tetrafluoroethylene copolymer having a comonomer content of 0.2 mole % to about 1 mole %, said comonomer being selected from perfluoroalkylvinylether, wherein the compound is produced by way of melt-compounding, wherein the compound has a homogeneous distribution of the proportions of the at least one further high-performance polymer and the polymer material, said homogeneous distribution being such that the individual polymer components of said at least one further high performance polymer and said polymer material are no longer recognizable by way of coloring techniques in conjunction with a light microscope or using polarized light, and wherein the elongation at failure of the compound amounts to 20% or more.

2. Compound according to claim 1, wherein the fully fluorinated thermoplastically workable polymer material comprises about 50% by weight or more of melt-processable polytetrafluoroethylene.

3. Compound according to claim 1, wherein the compound is substantially free of pores.

4. Compound according to claim 1, wherein the compound comprises additives in proportions of up to approximately 60% by weight of the total weight of the compound.

5. Compound according to claim 4, wherein one or more fillers are contained as additives.

6. Compound according to claim 5, wherein the filler or fillers are selected from BN, SiC, MoS$_2$, polytetrafluoroethylene, carbon fibres, glass spheres, hollow glass spheres, glass fibres, carbon black, carbon particles and graphite.

7. Structural part produced using a compound according to claim 1.

8. Structural part according to claim 7, wherein the structural part is configured as a pipe.

9. Structural part according to claim 7, wherein the structural part is a flexible tube.

10. Structural part according to claim 7, wherein the structural part is produced as an injection moulded part.

11. Structural part according to claim 7, wherein the compound is foamed.

12. Electric cable with an insulation produced using a compound according to claim 1.

13. Electric cable according to claim 12, wherein the insulation has a foam structure.

14. Electric cable according to claim 12, wherein said cable is a high-frequency cable.

15. Structural part according to claim 7, wherein said part is a mechanically loaded structural part.

16. Plain bearing produced using a compound according to claim 1.

17. Plain bearing according to claim 16, wherein the plain bearing is a dry-running plain bearing.

18. The compound of claim 1 wherein the homogeneous distribution is substantially free of polymer island structures of a size of about 0.2 μm or more.

* * * * *